July 11, 1967

JAMES E. WEBB
ADMINISTRATOR OF THE NATIONAL AERONAUTICS
AND SPACE ADMINISTRATION
CENTRAL SPAR AND MODULE JOINT 3,330,082

Filed Feb. 11, 1965

MICHAEL DUBEY
RONALD M. DIAMOND
INVENTORS

BY
Howard B. Scheckman
ATTORNEYS

July 11, 1967  JAMES E. WEBB  3,330,082
ADMINISTRATOR OF THE NATIONAL AERONAUTICS
AND SPACE ADMINISTRATION
CENTRAL SPAR AND MODULE JOINT
Filed Feb. 11, 1965  3 Sheets-Sheet 2
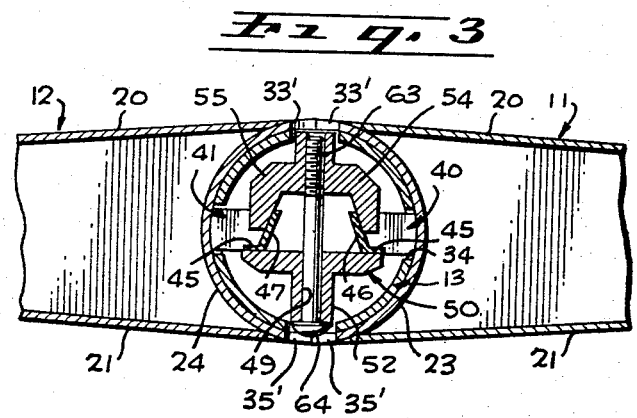
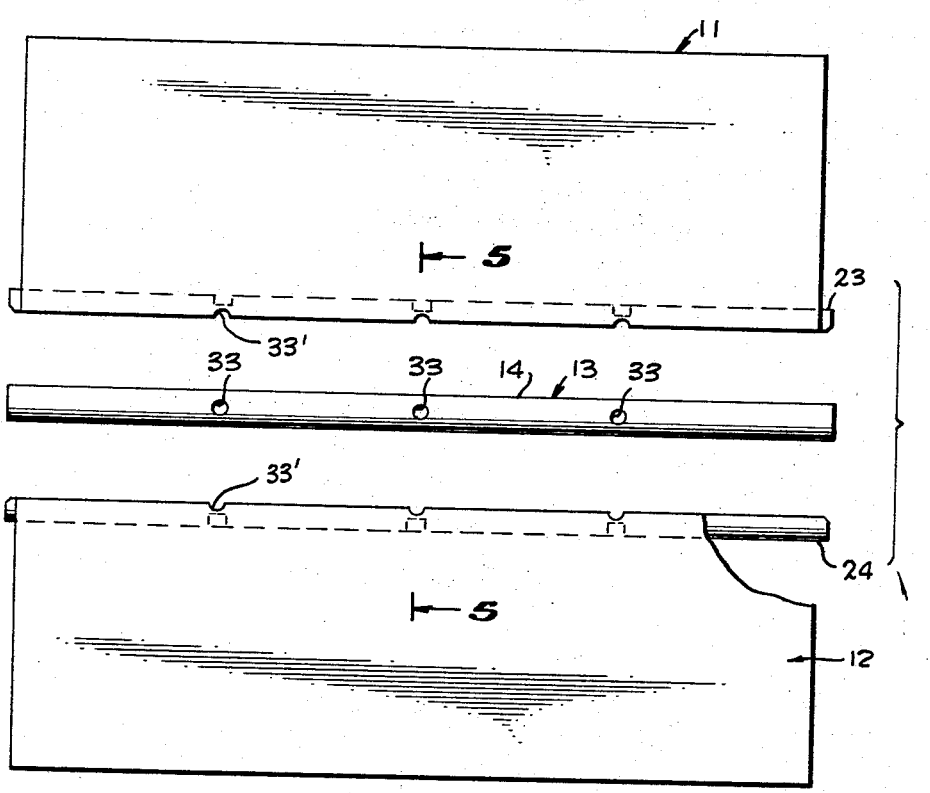
MICHAEL DUBEY
RONALD M. DIAMOND
INVENTORS
BY
Howard B. Scheckman
ATTORNEYS

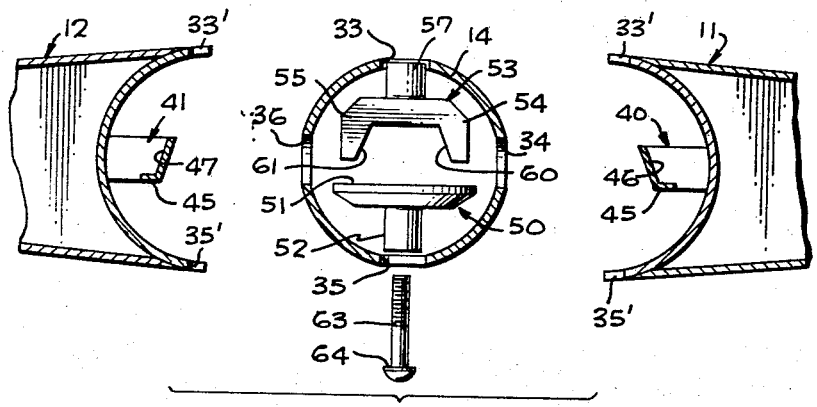
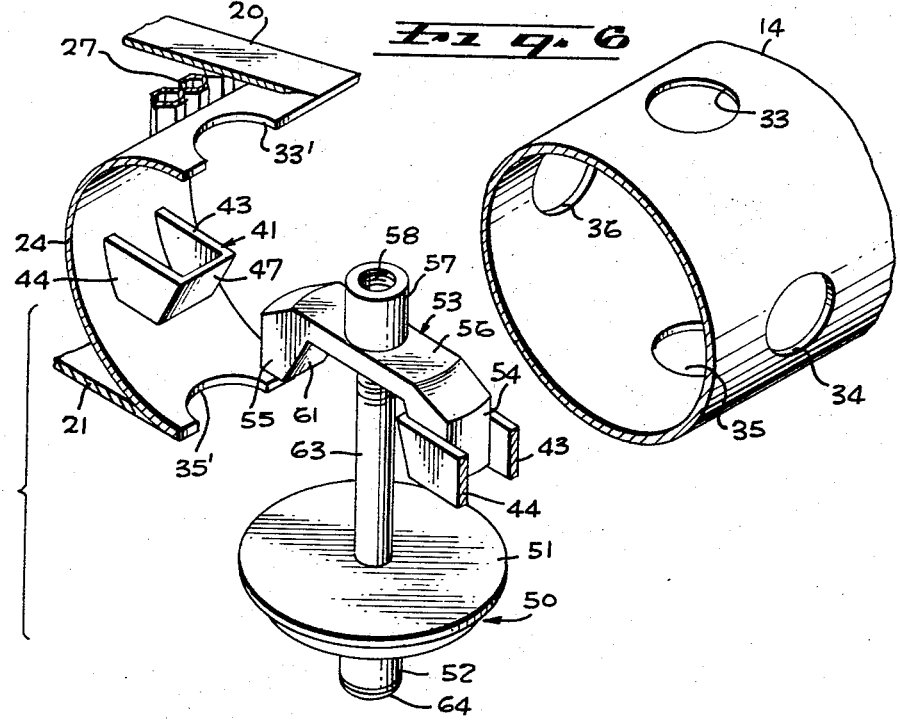

United States Patent Office 3,330,082
Patented July 11, 1967

3,330,082
CENTRAL SPAR AND MODULE JOINT
James E. Webb, Administrator of the National Aeronautics and Space Administration, with respect to an invention of Michael Dubey and Ronald M. Diamond, both of Los Angeles, Calif.
Filed Feb. 11, 1965, Ser. No. 432,025
5 Claims. (Cl. 52—127)

ABSTRACT OF THE DISCLOSURE

This invention relates to a module joint arrangement for attaching together, (1) a hollow central member having a longitudinal axis, and (2) two members extending outwardly from said central member. The extending members contain straps that pass through openings in the surface of the central member, and that extend into its interior. Clamp means is carried within the central member and engages the straps to clamp them transversely together within the central member. The clamp means includes a base section and wedge section that are movable transversely relative to the axis of the central member to clamp onto the straps, and form a secure joint.

---

This invention relates to a joint arrangement utilized for attaching elements or branches to a central member and also relates to clamp means for use in the joint arrangement.

The present invention is particularly adapted for the assembly of solar arrays which consist of a central spar member to which are connected solar modules. At present, mechanical problems associated with the fabrication of such structures are numerous since the solar array must extend into space and be firmly supported. Present types of fasteners are not satisfactory for this purpose since they are directed either to the clamping together of the two flat plates or to the attachment together of two flat panels which differ in construction from a solar array. Basically, the present invention provides a joint arrangement connecting two oppositely extending members to opposite sides of a central spar member. The opposite extending members have inner end panels that are complementary to the surface of the spar member and each member has a clamp receiving projection that projects inwardly through an opening in the side of the spar member. The oppositely extending members can consist of the two modules of a solar panel which is supported by a spar consisting of the cylindrical member. The clamp portion of the joint arrangement consists of a base section which locates the projections from the extending members and a tapered section which engages cam surfaces on the projections. A bolt connects the two portions together and serves to pull the two members together and against the supporting spar member.

It is therefore an object of the present invention to provide a joint arrangement for attaching extending members to a central spar member for support thereby.

Another object of the present invention is to provide a clamp for securing two extending members to a central spar member with the members projecting to opposite sides of the central member.

Another object of the present invention is to provide a joint arrangement for members which are located on opposite sides of a hollow cylindrical member and have inwardly extending projections which extend through the cylindrical member and are pulled towards the center of the cylindrical member by clamp means in order to hold the members tightly against the cylindrical member.

A further object of the present invention is to provide a novel clamp for connecting two oppositely extending members to a central spar member.

These and other objects of the invention not specifically set forth above will become readily apparent from the accompanying description and drawings in which:

FIGURE 1 is a perspective view of a solar paddle which incorporates the present invention and consists of a central cylindrical spar member supporting two solar modules extending from the spar member;

FIGURE 2 is a top plan view of the solar paddle of FIGURE 1 illustrating the construction of each of the solar modules;

FIGURE 3 is a vertical section along line 3—3 of FIGURE 2 showing the two portions of the clamp which serve to pull the solar modules into contact with the central cylindrical member;

FIGURE 4 is an expanded top plan view similar to FIGURE 2 showing the three members of the solar paddle construction;

FIGURE 5 is an unassembled view of the clamp along line 5—5 of FIGURE 4; and

FIGURE 6 is an expanded perspective of the clamp.

Referring to the embodiment of the invention chosen for purposes of illustration, a solar paddle 10 comprises two solar modules 11 and 12 which are supported on a central cylindrical spar 13. The spar consists of a central cylindrical member 14 with solid plugs 15 and 16 fixed in opposite ends thereof. The plug 16 is attached by bracket 17 to a supporting structure 18 so that the paddle extends outwardly from the structure. Each of the solar modules 11 and 12 have top and bottom panels 20 and 21, respectively, and outer end panels 22. Also, module 11 has a curved inner end panel 23 and the module 12 has a curved inner end panel 24, both of which are shaped to conform to the surface curvature of member 14. A honeycomb structure 27 is contained within each of the solar modules 11 and 12 for internal support and solar cells (not shown) are secured to the outside surface of the modules.

The cylindrical member 14 contains, at each of three spaced locations, holes 33, 34, 35 and 36 which are spaced apart 90 degrees (see FIGURE 6). The inner end panel 23 of module 11 carries three straps 40, each of which projects through one of the openings 34 in the cylindrical member 14 and the inner end panel 24 of module 12 carries three straps 41, each of which projects through one of the openings 36 in the cylindrical member 14. Each of the straps 40 and 41 have opposite sides 43 and 44 connected by bottom strap 45 and strap 40 has a tapered end surface 46 while strap 41 has a tapered end surface 47.

The clamp means for connecting the modules 11 and 12 to the central spar 13 consists of a base section 50 having a flat surface member 51 connected with a tubular extension 52 and an opening 49 extends through member 51 and extension 52. Upper wedge section 53 of the fastening means consists of arms 54 and 55 extending angularly from a central portion 56 toward section 50. A projection 57 extends from portion 56 and the portion 56 and projection 57 contain a threaded opening 58. The arms 54 and 55 have wedge surfaces 60 and 61, respectively, which engage the surfaces 46 and 47, respectively, when the arms are inserted between the sides 43 and 44 of the straps 40 and 41 after the straps have been insereted through openings 34 and 36 in member 14 (see FIGURE 3). When the arms 54 and 55 are inserted into the straps 40 and 41, the bottom 45 of the straps will rest upon the flat surface 51. A bolt 63 is inserted through opening 49 and threaded into opening 58 so that rotation of the bolt at head 64 will draw the sections 50 and 53 together and the wedge surfaces 61 and 62 acting against the strap cam surfaces 46 and 47 will pull modules 11 and 12 toward the central cylinder member 14 until the inner side panels 23 and 24 are tightly held against the cylinder member 14.

In assembling the fastener means, the clamp sections 50 and 53 are first inserted into the interior of the cylindrical member 14 until projection 57 is opposite an opening 33 and projection 52 is opposite opening 35. The edge of the inner end surfaces 23 and 24 have semi-circular cutouts 33' and 35' so that when the surfaces 23 and 24 are drawn tightly against the cylindrical member 14, the cutouts define openings for the projections 52 and 57 above the openings 33 and 35. Thus, the projections 52 and 57 can extend through the openings 33 and 35 in order to attach the clamp sections 50 and 53 to the straps 40 and 41 and continual access is provided to the head 64 of the bolt 63. After all the bolts 63 have been tightened down, the modules 11 and 12 are firmly secured to the central spar 13 along the full length of the spar as illustrated in FIGURES 1–3. During the tightening of the bolt, the clamp sections remain centered because of opposite forces on the straps 40 and 41.

While the invention has been illustrated in connection with solar array fabrication, it is obvious that the invention broadly relates to a joint arrangement for connecting two oppositely extending members to a central spar member. Various types of pulling devices could be utilized within the spar to pull the extending members together and the surfaces of the spar member and end surfaces of the extending members which engage each other can be of various shapes. Various other modifications are contemplated by those skilled in the art without departing from the spirit and scope of the invention as hereinafter defined by the appended claims.

What is claimed is:
1. A joint arrangement comprising:
   a central spar member having a longitudinal axis;
   extending members extending outwardly from said central spar member, each member having an end panel adjacent said spar member of the same surface contour as said spar member;
   strap means projecting outwardly from each of said end panel and having tapered cam surfaces thereon;
   a plurality of openings in said spar member to receive said strap means and locate said tapered surfaces within the interior of said spar member; and
   clamp means located within said spar member and positioned transversely to said longitudinal axis of said spar member, for engaging said tapered cam surfaces and drawing said extending members into end engagement with the surface of said spar member, said clamp means including a base section, a tightening bolt, and a wedge section, said sections being connected together for relative movement transversely to the axis of said spar member when tightening said bolt, said wedge section having wedge surfaces engaging said cam surfaces on said strap means, and said base section engaging the bottom of said strap means to support said strap means while said wedge section is drawn relative to said base section to move said cam surfaces into said spar member and draw said end panels against said spar member.

2. A joint arrangement as defined in claim 1 wherein said cam surfaces on said strap means comprises inclined, flat surfaces supported in spaced relationship to said end panels, said wedge surfaces having the same taper as said cam surfaces and engaging said cam surfaces on the sides thereof facing said end panels.

3. A joint arrangement as defined in claim 1 wherein said spar member has assembly openings displaced from the openings for said strap means, said tightening bolts being accessible from the exterior of said spar member through said assembly openings.

4. In a joint arrangement for attaching extending members to a central member having a longitudinal axis, by inserting cam means on the ends of said extending members through openings in said central member and clamping said cam means on said extending members transversely together inside said central member:
   clamp means located within said central member and engaging said cam means for drawing said extending means into engagement with said central member;
   said clamp means comprising a base section, tightening bolt, and a wedge section, said sections connected together for relative movement transversely to said longitudinal axis of said central member by tightening said bolt;
   said wedge section having a wedge surface engaging said cam means; and
   said base section engaging the bottom of said cam means to support said cam means while said wedge section is drawn transversely relative to said longitudinal axis of said central member toward said base section by said bolt to move said cam means into said central member and draw said extending members against said central member, said wedge and base sections applying the sole force on said cam means.

5. In a joint arrangement as defined in claim 4 wherein said cam means have cam surfaces that comprise inclined, flat surfaces supported in spaced relationship to said extending members, said wedge surfaces having the same taper as said cam surfaces and engaging said cam surfaces on the sides thereof facing said extending members.

References Cited

UNITED STATES PATENTS

| 2,582,657 | 1/1952 | Serner | 52—584 X |
| 2,759,574 | 8/1956 | Miller | 52—720 X |
| 2,962,133 | 11/1960 | Kivett et al. | 52—580 |
| 3,062,339 | 11/1962 | Geyser | 287—189.36 X |

FOREIGN PATENTS

| 589,029 | 12/1959 | Canada. |
| 585,965 | 3/1947 | Great Britain. |

FRANK L. ABBOTT, *Primary Examiner.*

A. C. PERHAM, *Assistant Examiner.*